(12) United States Patent
Yeh (10) Patent No.: US 9,996,911 B2
(45) Date of Patent: Jun. 12, 2018

(54) IMAGE PROCESSING DEVICE AND RELATED IMAGE COMPRESSION METHOD

(71) Applicant: VATICS INC., New Taipei (TW)

(72) Inventor: Chao-Chi Yeh, New Taipei (TW)

(73) Assignee: VATICS INC., New Taipei (TW)

( * ) Notice: Subject to any disclaimer, the term of this patent is extended or adjusted under 35 U.S.C. 154(b) by 59 days.

(21) Appl. No.: 15/194,586

(22) Filed: Jun. 28, 2016

(65) Prior Publication Data

US 2017/0193640 A1     Jul. 6, 2017

(30) Foreign Application Priority Data

Jan. 6, 2016     (TW) .............................. 105100228 A (51) Int. Cl.

| | |
|---|---|
| *G06T 5/20* | (2006.01) |
| *H04N 19/117* | (2014.01) |
| *G06T 1/00* | (2006.01) |
| *G06T 5/00* | (2006.01) |
| *H04N 19/136* | (2014.01) |
| *H04N 19/174* | (2014.01) |

(52) U.S. Cl.
CPC .............. *G06T 5/20* (2013.01); *G06T 1/0007* (2013.01); *G06T 5/002* (2013.01); *H04N 19/117* (2014.11); *H04N 19/136* (2014.11); *H04N 19/174* (2014.11); *G06T 2207/20012* (2013.01)

(58) Field of Classification Search
CPC . G06T 5/40; G06T 2207/10024; G06T 5/002; G06T 1/0007; G09G 2310/024; H04N 5/7416; H04N 19/46; H04N 9/3179
See application file for complete search history.

(56) References Cited

U.S. PATENT DOCUMENTS

| | | | | |
|---|---|---|---|---|
| 7,440,010 | B2* | 10/2008 | Fujita | H04N 1/2112 |
| | | | | 348/222.1 |
| 8,055,900 | B2* | 11/2011 | Iwamura | G06T 1/0021 |
| | | | | 348/14.13 |
| 2010/0128138 | A1* | 5/2010 | Nitta | H04N 1/00458 |
| | | | | 348/222.1 |
| 2011/0050934 | A1* | 3/2011 | Mitsunaga | H04N 1/58 |
| | | | | 348/222.1 |

FOREIGN PATENT DOCUMENTS

| | | |
|---|---|---|
| CN | 101141560 A | 3/2008 |
| CN | 104219521 A | 12/2014 |

* cited by examiner

*Primary Examiner* — Trung Diep
(74) *Attorney, Agent, or Firm* — Winston Hsu (57) ABSTRACT

An image processing device and a related image compression method are applied to filter the fixed pattern noise of an image. The image compression method includes applying characteristic value calculation to the image along a predetermined direction to generate a series of characteristic values, comparing a pixel matrix of the image with the series of characteristic values, and acquiring a difference matrix according to a comparison result. The foresaid difference matrix can be compressed to indicate as a compression datum of the image.

18 Claims, 7 Drawing Sheets

IMAGE PROCESSING DEVICE AND RELATED IMAGE COMPRESSION METHOD

BACKGROUND OF THE INVENTION

1. Field of the Invention

The present invention relates to an image processing device and a related image compression method, and more particularly, to an image processing device and a related image compression method capable of applying to filter the fixed pattern noise of an image.

2. Description of the Prior Art

The conventional surveillance camera and the vehicle operation recorder capture an image and store the foresaid image directly into the memory unit, and then the operation processing unit reads the foresaid image from the memory unit to execute a related image processing procedure in accordance with a control command of the user. For this reason, the conventional surveillance camera and the vehicle operation recorder waste transmission frequency bandwidth during the image read-in/read-out procedures, storage quantity of the memory unit is occupied by the unprocessed image, and the surveillance camera and/or the vehicle operation recorder cannot provide preferred image processing efficiency.

SUMMARY OF THE INVENTION

The present invention provides an image processing device and a related image compression method capable of applying to filter the fixed pattern noise of an image for solving above drawbacks.

According to the claimed invention, an image compression method includes applying characteristic value calculation to an image along a predetermined direction to generate a series of characteristic values, comparing a pixel matrix of the image with the series of characteristic values, and acquiring a difference matrix according to a comparison result, wherein the difference matrix is compressed and indicated as a compression datum of the image.

According to the claimed invention, a step of applying the characteristic value calculation to the image along the predetermined direction includes dividing the pixel matrix of the image into a plurality of regions, applying the characteristic value calculation to each region of the plurality of regions along the predetermined direction, and arranging results of the characteristic value calculation applied to the each region of the plurality of regions in sequence to form the series of characteristic values.

According to the claimed invention, an image processing device includes an image capturing unit and an image capturing unit. The image capturing unit is adapted to capture an image. The operation processing unit is electrically connected to the image capturing unit and adapted to apply characteristic value calculation to the image along a predetermined direction to generate a series of characteristic values, to compare a pixel matrix of the image with the series of characteristic values, and to acquire a difference matrix according to a comparison result, wherein the difference matrix is compressed and indicated as a compression datum of the image.

The noise of the fixed pattern may be formed on the captured image due to quality of the image capturing unit. For filtering the said noise of the fixed pattern, the image processing device of the present invention utilizes the image compression method to calculate the series of characteristic values of the image along the specific predetermined direction, and then generates the difference matrix via a comparison between the series of characteristic values and the image pixel matrix. The difference matrix contains parameter information of the pixel matrix, compression of the difference matrix has preferred efficiency rather than compression of the image pixel matrix owing to datum region similarity, and the compression of difference matrix has advantages of reduced data quantity and economized transmission frequency bandwidth while accessing the memory unit because the difference matrix owns the smaller domain range. The image processing device and the related image compression method of the present invention can be used to filter the noise of the fixed pattern on the image, and to increase compression efficiency and economize the transmission frequency bandwidth accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
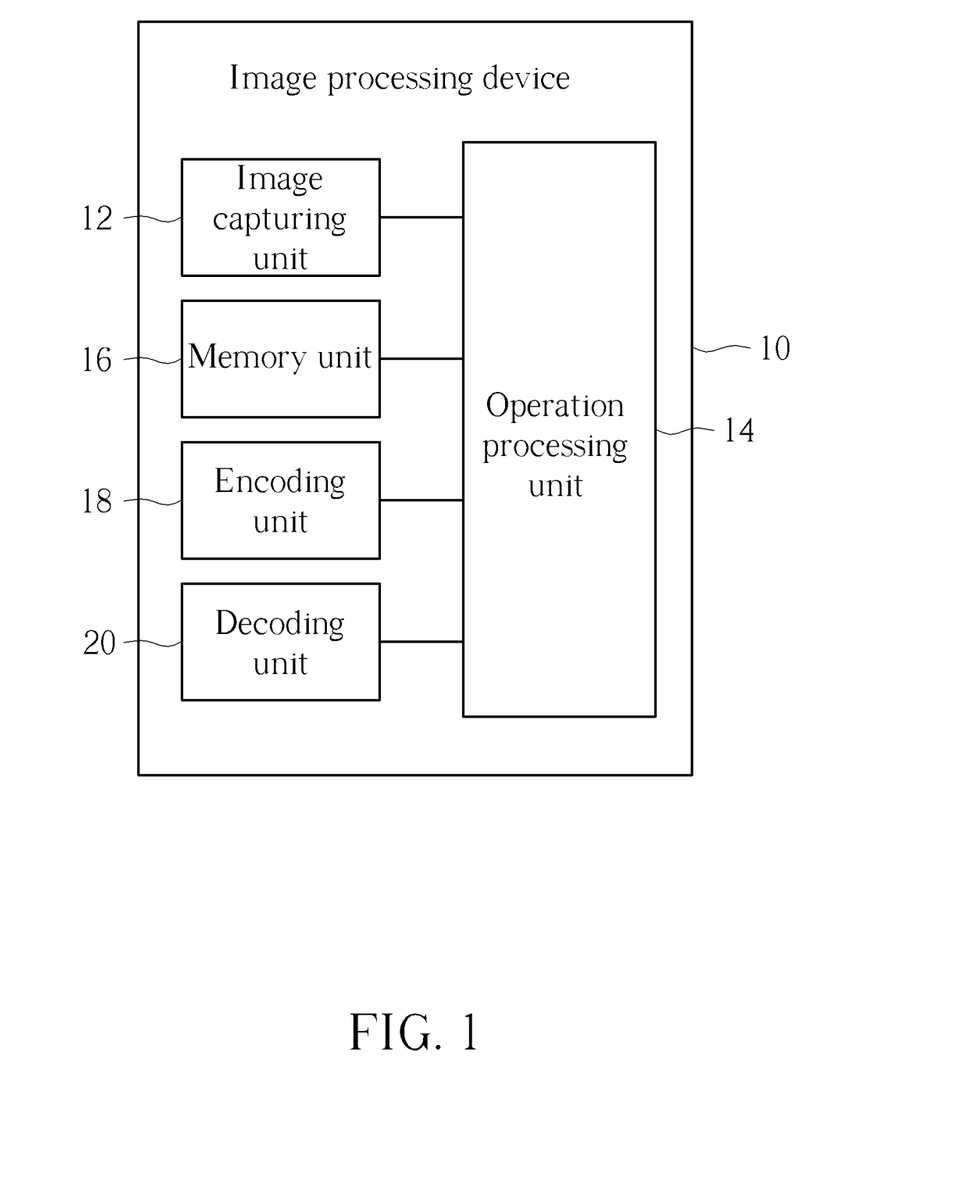
FIG. 1 is a functional block diagram of an image processing device according to an embodiment of the present invention.

Please refer to FIG. 1. FIG. 1 is a functional block diagram of an image processing device 10 according to an embodiment of the present invention. The image processing device 10 includes an image capturing unit 12, an operation processing unit 14, a memory unit 16, an encoding unit 18 and a decoding unit 20. The image processing device 10 can be the surveillance camera or the vehicle operation recorder. The image capturing unit 12 is utilized to capture a corresponding image. Related information of the image is stored into the memory unit 16. The operation processing unit 14 is electrically connected to the image capturing unit 12 and the memory unit 16, and adapted to compress the related information of the image captured by the image capturing unit 12, so as to economize transmission frequency bandwidth and storage quantity in a process of storing the related information of the image into the memory unit 16. An image compression method is applied to the image processing device 10 of the present invention. The image compression method executes a step of preliminary process before image compression, and the said preliminary process can reduce a domain range of the image to effectively decrease data quantity, so as to economize the frequency bandwidth while storing and transmitting the image.

Figure 2:
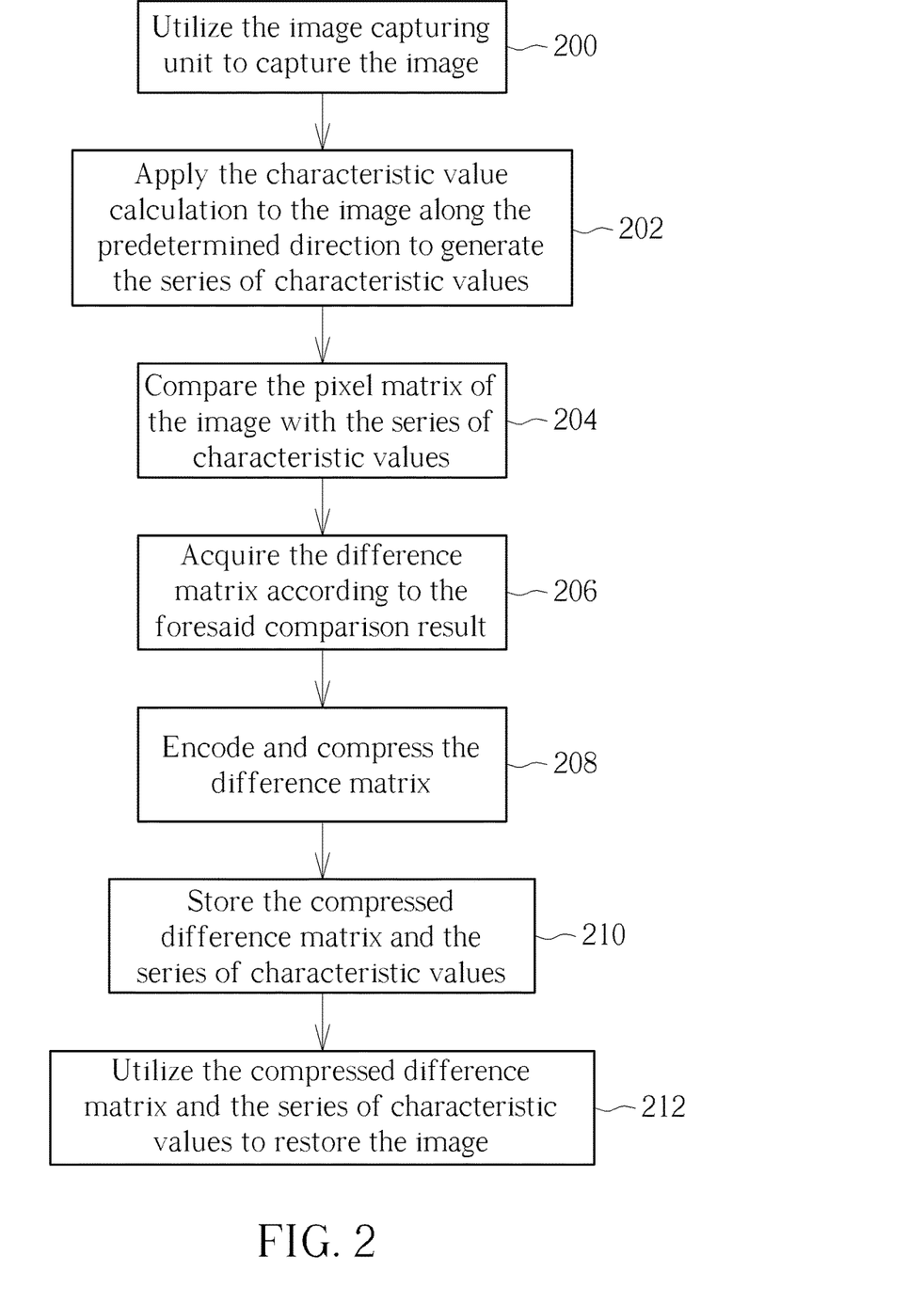
FIG. 2 is a flowchart of an image compression method according to the embodiment of the present invention.
Figure 3:
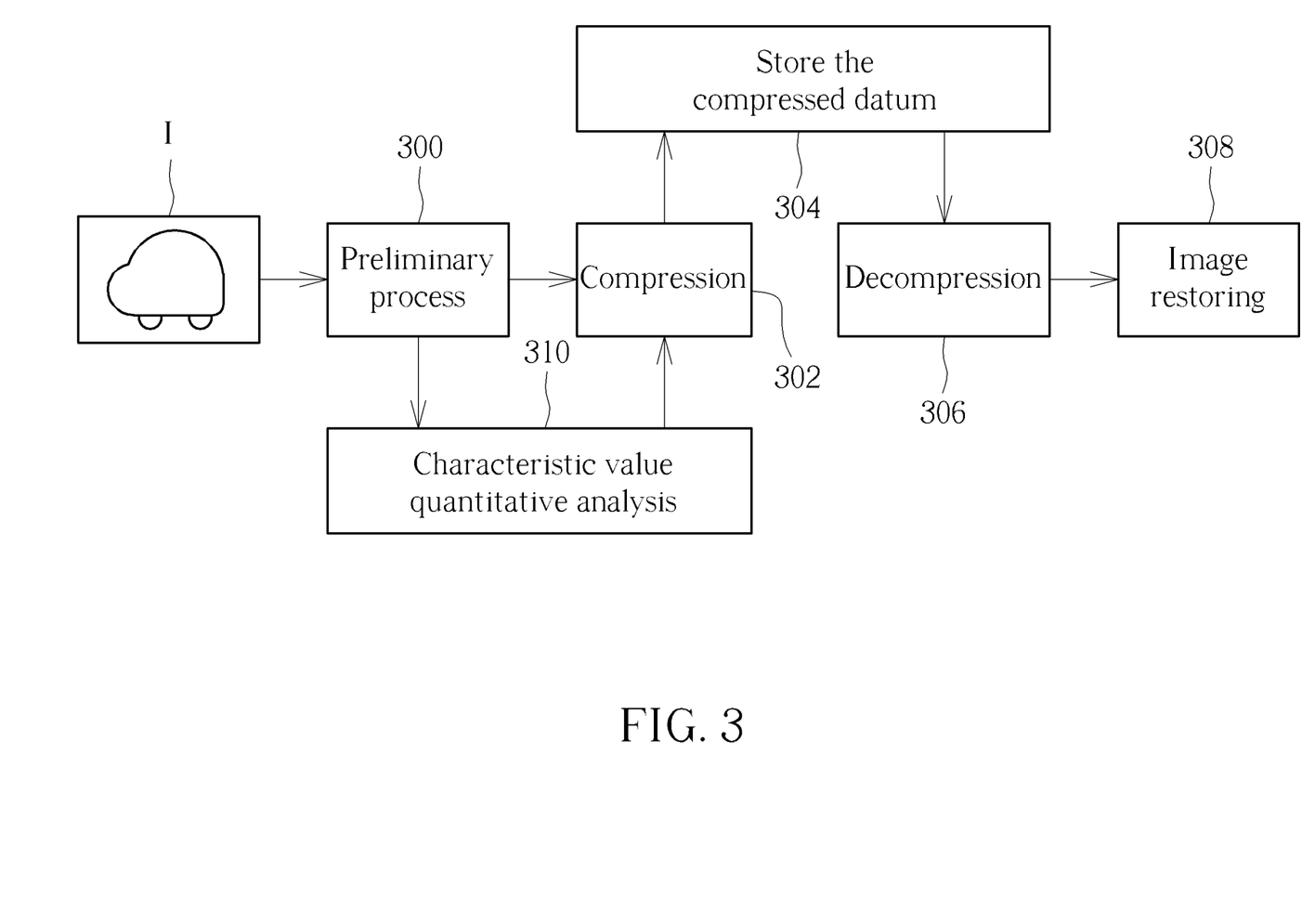
FIG. 3 is a functional block diagram of the image compression method according to the embodiment of the present invention.
Figure 4:
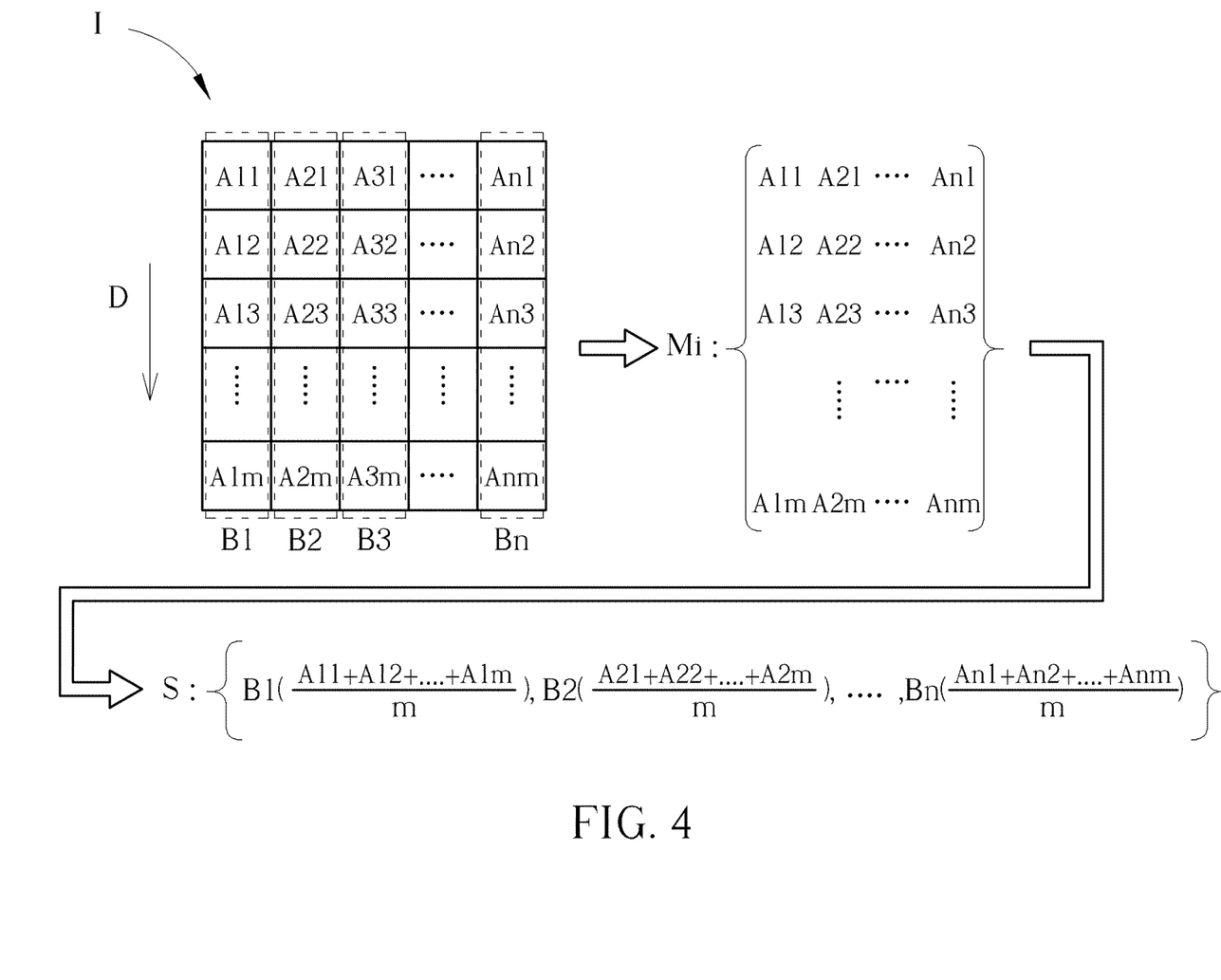
FIG. 4 is a diagram of an image captured by an image capturing unit according to the embodiment of the present invention.
Figure 5:
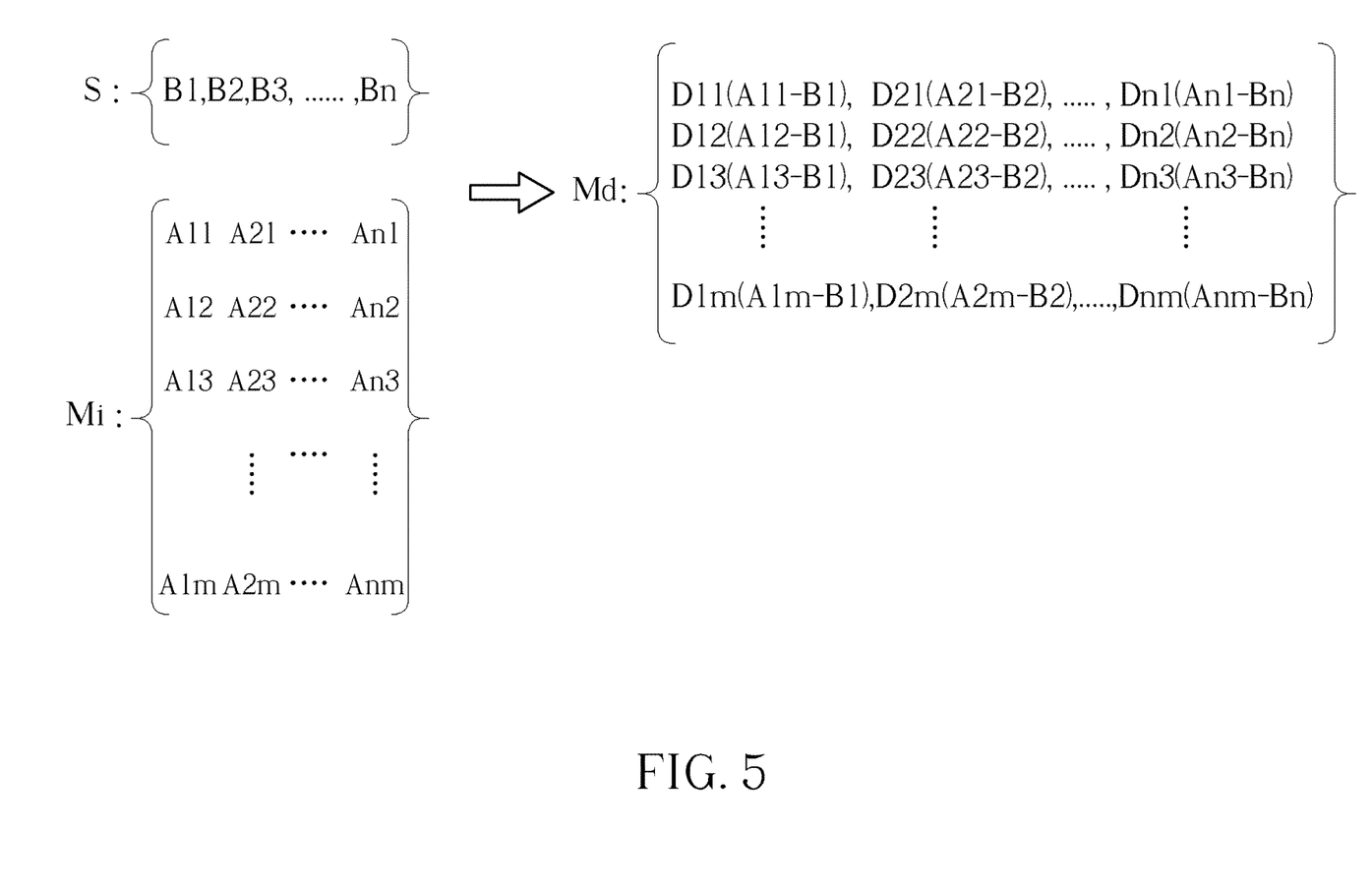
FIG. 5 is a diagram of the image processed by characteristic value calculation according to the embodiment of the present invention.

Please refer to FIG. 2 to FIG. 5. FIG. 2 is a flow chart of the image compression method according to the embodiment of the present invention. FIG. 3 is a functional block diagram of the image compression method according to the embodiment of the present invention. FIG. 4 is a diagram of an image I captured by the image capturing unit 12 according to the embodiment of the present invention. FIG. 5 is a diagram of the image I processed by characteristic value calculation according to the embodiment of the present invention. The image compression method illustrated in FIG. 2 and FIG. 3 are suitable for the image processing device 10 shown in FIG. 1. First, step 200 is executed that the image processing device 10 utilizes the image capturing unit 12 to capture the image I. Then, step 202 is executed and the characteristic value calculation is applied to the image I along a predetermined direction D by the operation processing unit 14, so as to generate a series of characteristic values accordingly. As shown in FIG. 3, the image I is a m×n pixel matrix Mi (which means the image I is composed of m* pixel rows and n* pixel columns). Numerals of m, n are integrals, and the numeral of m can be the same as or different from the numeral of n.

In step 202, the image compression method can divide the pixel matrix Mi of the image I into a plurality of regions along the predetermined direction D, such like each pixel row or each pixel column of the pixel matrix Mi being indicated as one region which can be the dotted region shown in FIG. 4. The image compression method applies the characteristic value calculation to each region, to calculate a value of corresponding pixels within the each region selected from a group consisting of a mean value, a maximal value, a minimal value, a median value, and a combination thereof, and the foresaid value of the corresponding pixels is represented as a characteristic value of the each region. For example, the characteristic value B1 can be the mean value of the pixels A11, A12, A13~A1m, the characteristic value B2 can be the mean value of the pixels A21, A22, A23~A2m, the characteristic value B3 can be the mean value of the pixels A31, A32, A33~A3m, the characteristic value Bn can be the mean value of the pixels An1, An2, An3~Anm, and a detailed application is omitted herein for simplicity. Results of the characteristic value calculation applied to the each region are arranged in sequence to form the series of characteristic values S. Therefore, the image compression method can utilize the characteristic value calculation to transform the pixel matrix Mi of the image I (which has m*n pixels) into the series of characteristic values S with n values (which has the characteristic values B1, B2, B3~Bn).

Then, steps 204 and 206 are executed to compare the pixel matrix Mi of the image I with the series of characteristic values S by the operation processing unit 14 so as to acquire a difference matrix Md according to a comparison result. In the embodiment of the present invention, as shown in FIG. 5, the image compression method subtracts corresponding characteristic values of the series of characteristic values S from the pixel matrix Mi to generate the difference matrix Md, which means the value D11 of the difference matrix Md is generated by subtracting the value B1 from the value A11, and other values of the difference matrix Md are generated by the same calculation, or may be set by other calculation and a detailed description is omitted herein for simplicity. Any calculation of utilizing the series of characteristic values S to reduce the domain range of the pixel matrix Mi for acquiring the difference matrix Md belongs to a scope of the present invention. That is, the difference matrix Md contains parameter information of the pixel matrix Mi, and the domain range of the difference matrix Md is smaller than the domain range of the pixel matrix Mi, so that the pixel matrix Mi can be replaced by the difference matrix Md to decrease compression data quantity and to economize transmission frequency bandwidth during compression and transmission of the difference matrix Md. Steps 204 and 206 belong to the step of preliminary process of the functional block 300.

The encoding unit 18 and the decoding unit 20 of the image processing device 10 can be independent from the image capturing unit 12, or be a built-in module of the image capturing unit 12. After the step of preliminary process in accordance with the above-mentioned procedures (the step of transforming the pixel matrix Mi of the image I into the difference matrix Md with the reduced domain range), the image compression method further executes steps 208, 210 and 212 to encode and compress the difference matrix Md by the encoding unit 18 (which is represented as the functional block 302) so the compressed difference matrix Md can be indicated as a compression datum of the image I, to store the compressed difference matrix Md and the series of characteristic values S into the memory unit 16 (which is represented as the functional block 304), to take out the compressed difference matrix Md from the memory unit 16 according to user's demand and then decode the compressed difference matrix Md via the decoding unit 18 (which is represented as the functional block 306), and to restore the image to an initial condition captured by the image capturing unit 12 (which is represented as the functional block 308). In step 212, the image compression method utilizes the series of characteristic values S and the compressed difference matrix Md to proceed with the image restoring procedure.

It should be mentioned that while the pixel matrix Mi of the image I is transformed into the difference matrix Md via the functional block 300, the image compression method not only can directly apply compression step of the functional block 302 to the difference matrix Md, but also can pre-execute characteristic value quantitative analysis of the functional block 310 optionally. The characteristic value quantitative analysis sets a difference value of the difference matrix Md lower than a specific threshold as a predetermined value (for example, the difference values smaller than numeral of 3 are defined as zero), then records an amount of the predetermined value to be a read-in parameter of the difference matrix Md; furthermore, the above-mentioned step of setting the predetermined value can be executed by other application, for example, the image compression method may pre-set a threshold, defines the difference value (which is lower than a specific numeral after subtracting the threshold from the original difference value) as the above-mentioned predetermined value, and then the predetermined value can be defined as the read-in parameter of the difference matrix Md. Thus, an amount of the difference value within the difference matrix Md is lower than the numeral of n, the data quantity of the difference matrix Md can be effectively decreased, and the transmission frequency bandwidth between the functional block 302 and the functional block 304 can be reduced accordingly.

Figure 6:
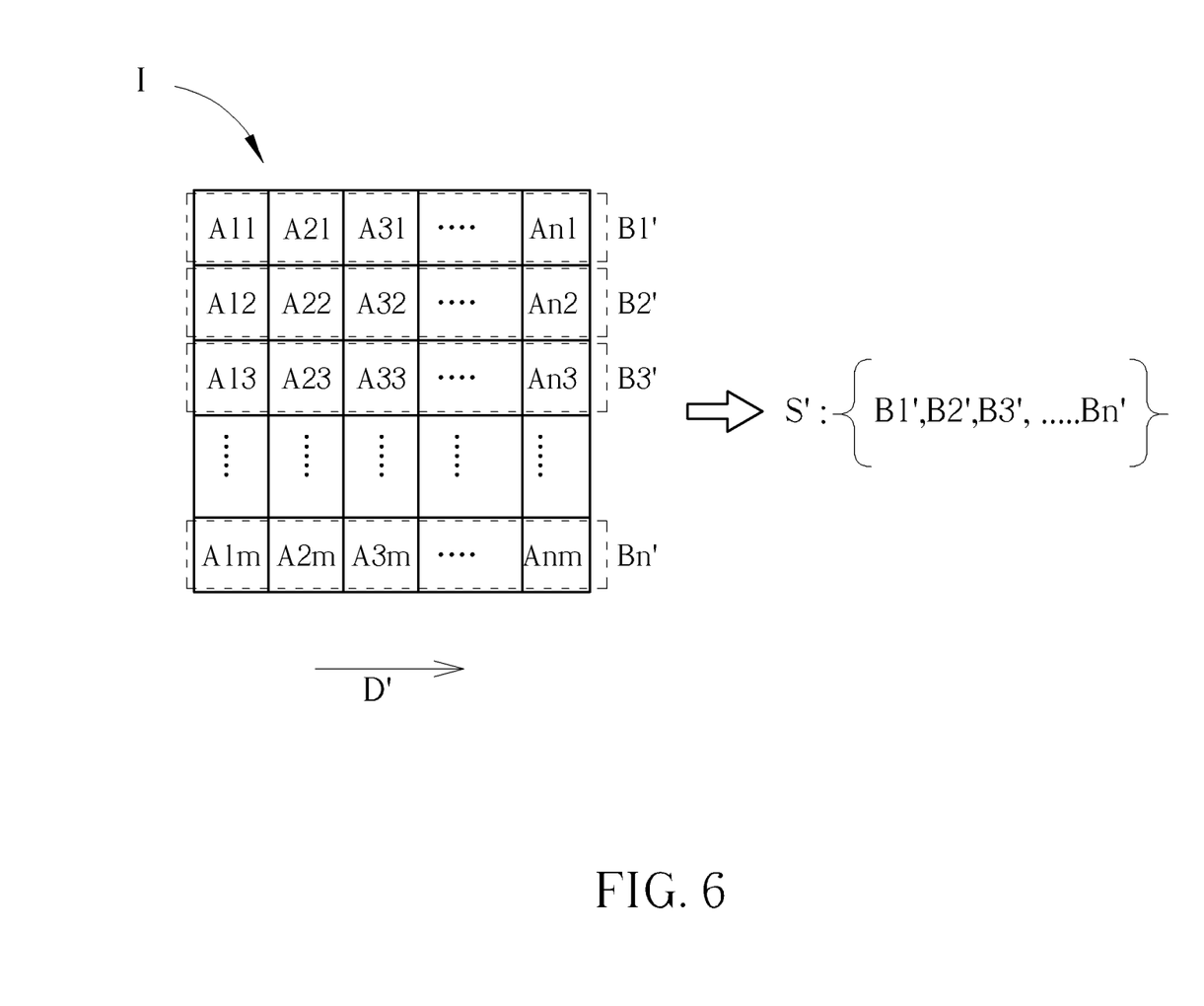
FIG. 6 is a diagram of the characteristic value calculation applied to the image according to other embodiment of the present invention.

Please refer to FIG. 6. FIG. 6 is a diagram of the characteristic value calculation applied to the image I according to other embodiment of the present invention. In the embodiment shown in FIG. 4, the predetermined direction D is a vertical direction of the pixel matrix Mi. In other possible embodiments, the image compression method may use the predetermined direction D' with any orientation to execute the characteristic value calculation. As shown in FIG. 6, the predetermined direction D' is a transverse direction of the pixel matrix Mi, the characteristic value B1' can be the mean value or other calculation value of pixels A11, A21, A31~Ab1, the characteristic value B2' can be the mean value or other calculation value of pixels A12, A22, A32~An2, the characteristic value B3' can be the mean value or other calculation value of pixels A1m, A2m, A3m~Anm, so as to form the series of characteristic values S' including the characteristic values B1'~Bn'. As illustrated in FIG. 2, the image compression method utilizes the pixel matrix Mi and the series of characteristic values S' to generate the corresponding difference matrix, the difference matrix having the domain range smaller than ones of the pixel matrix Mi can be utilized to decrease the compressed data quantity and to reduce the transmission frequency bandwidth of the image I.

In addition to the above-mentioned embodiments, the predetermined direction used in the image compression method of the present invention further can be designed as an inclined direction of the pixel matrix Mi. For example, while the predetermined direction is the 45-degree inclined direction, a region of the pixel matrix Mi is composed of the characteristic values A11, A22, A33 etc., other regions of the pixel matrix Mi are composed of the characteristic values A21, A32 etc. and the characteristic values A12, A23 etc., and the said characteristic values are arranged to form the related series of characteristic values. While the predetermined direction is the 135-degree inclined direction, a region of the pixel matrix Mi is composed of the characteristic values A31, A22, A13 etc., other regions of the pixel matrix Mi are composed of the characteristic values A12, A21 etc. and the characteristic values A32, A23 etc., and the characteristic values calculated by the said regions are arranged to form the related series of characteristic values. Variation of the predetermined direction and the series of characteristic values are not limited to the above-mentioned embodiment, which depend on design demand, and a detailed description is omitted herein for simplicity.

Figure 7:
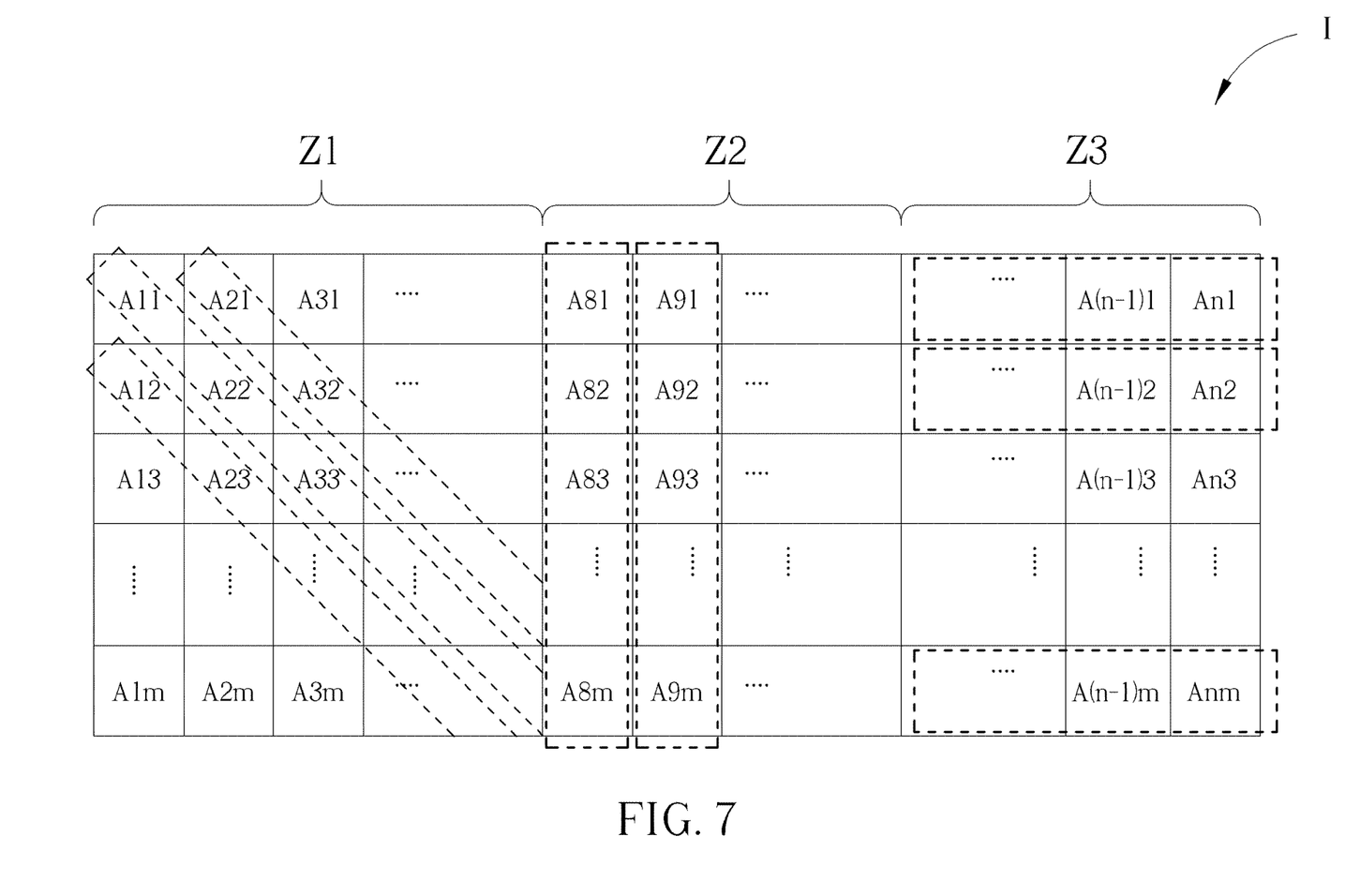
FIG. 7 is a diagram of the characteristic value calculation applied to the image according to other embodiment of the present invention.

Please refer to FIG. 7. FIG. 7 is a diagram of the characteristic value calculation applied to the image I according to other embodiment of the present invention. The embodiments shown in FIG. 4 and FIG. 6 apply the characteristic value calculation to the image I along the single predetermined direction D or predetermined direction D', however the present invention further can apply the characteristic value calculation to different regions of the image I respectively along different predetermined directions. First, the pixel matrix Mi of the image I is divided into several regions, for example, the pixel matrix Mi can be divided into the regions Z1, Z2 and Z3. Then, the image compression method transforms pixels within the first region Z1 into the corresponding series of characteristic values along the 45-degree inclined direction, transforms pixels within the second region Z2 into the corresponding series of characteristic values along the vertical direction, and transforms pixel within the third region Z3 into the corresponding series of characteristic values along the transverse direction. Hence, each of the foresaid series of characteristic values is compared with the corresponding region of the pixel matrix Mi to generate the difference matrix, and the difference matrix is compressed to be indicated as the compression datum of the related region.

In conclusion, noise of the fixed pattern may be formed on the captured image due to quality of the image capturing unit. For filtering the said noise of the fixed pattern, the image processing device of the present invention utilizes the image compression method to calculate the series of characteristic values of the image along the specific predetermined direction, and then generates the difference matrix via a comparison between the series of characteristic values and the image pixel matrix. The difference matrix contains parameter information of the pixel matrix, compression of the difference matrix has preferred efficiency rather than compression of the image pixel matrix owing to datum region similarity, and the compression of difference matrix has advantages of reduced data quantity and economized transmission frequency bandwidth while accessing the memory unit because the difference matrix owns the smaller domain range. Comparing to the prior art, the image processing device and the related image compression method of the present invention can be used to filter the noise of the fixed pattern on the image, and to increase compression efficiency and economize the transmission frequency bandwidth accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image compression method comprising:
   applying characteristic value calculation to pixels of each row or each column of an image along a predetermined direction to transform a pixel matrix of the image into a series of characteristic values;
   comparing one of each row and each column of the pixel matrix with the series of characteristic values; and
   acquiring a difference matrix according to a comparison result, wherein the difference matrix is compressed and indicated as a compression datum of the image.

2. The image compression method of claim 1, wherein a step of applying the characteristic value calculation to the image along the predetermined direction comprises:
   dividing the pixel matrix of the image into a plurality of regions;
   applying the characteristic value calculation to each region of the plurality of regions along the predetermined direction; and
   arranging results of the characteristic value calculation applied to the each region of the plurality of regions in sequence to form the series of characteristic values.

3. The image compression method of claim 2, wherein different regions of the plurality of regions are respectively processed by the characteristic value calculation along different predetermined directions.

4. The image compression method of claim 1, wherein the image compression method subtracts the series of characteristic values from each row of the pixel matrix to acquire the difference matrix with matrix parameter identical with ones of the pixel matrix.

5. The image compression method of claim 1, wherein the predetermined direction is vertical direction, a transverse direction and/or an inclined direction of the pixel matrix.

6. The image compression method of claim 1, wherein the characteristic value calculation calculates a value of corresponding pixels of the image selected from a group consisting of a mean value, a maximal value, a minimal value, a median value, and a combination thereof.

7. The image compression method of claim 1, further comprising:
   utilizing an encoder to encode and compress the difference matrix;

storing a compression result of the difference matrix into a memory; and obtaining the compression result from the memory via a decoder to restore the image.

8. The image compression method of claim 7, wherein the series of characteristic values and the difference matrix are utilized to restore the image.

9. The image compression method of claim 7, wherein the image compression method sets a difference value of the difference matrix lower than a threshold as a predetermined value, and records an amount of the predetermined value to decrease data quantity of the series of characteristic values.

10. An image processing device, comprising:

an image receiver adapted to capture an image; and an operation processor electrically connected to the image receiver and adapted to apply characteristic value calculation to pixels of each row or each column of the image along a predetermined direction to transform a pixel matrix of the image into a series of characteristic values, to compare one of each row and each column of the pixel matrix with the series of characteristic values, and to acquire a difference matrix according to a comparison result, wherein the difference matrix is compressed and indicated as a compression datum of the image.

11. The image processing device of claim 10, wherein the operation processor is further adapted to divide the pixel matrix of the image into a plurality of regions, to apply the characteristic value calculation to each region of the plurality of regions along the predetermined direction, and to arrange results of the characteristic value calculation applied to the each region of the plurality of regions in sequence to form the series of characteristic values.

12. The image processing device of claim 11, wherein different regions of the plurality of regions are respectively processed by the characteristic value calculation along different predetermined directions.

13. The image processing device of claim 10, wherein the image compression method subtracts the series of characteristic values from each row of the pixel matrix to acquire the difference matrix with matrix parameter identical with ones of the pixel matrix.

14. The image processing device of claim 10, wherein the predetermined direction is vertical direction, a transverse direction and/or an inclined direction of the pixel matrix.

15. The image processing device of claim 10, wherein the characteristic value calculation calculates a value of corresponding pixel of the image selected from a group consisting of a mean value, a maximal value, a minimal value, a median value, and a combination thereof.

16. The image processing device of claim 10, wherein the operation processor is further adapted to utilize an encoder to encode and compress the difference matrix, to store a compression result of the difference matrix into a memory, and to obtain the compression result from the memory unit via a decoder to restore the image.

17. The image processing device of claim 16, wherein the series of characteristic values and the difference matrix are utilized to restore the image.

18. The image processing device of claim 16, wherein the image compression method sets a difference value of the difference matrix lower than a threshold as a predetermined value, and records an amount of the predetermined value to decrease data quantity of the series of characteristic values.

* * * * *